United States Patent [19]
Bellasio

[11] 3,845,323
[45] Oct. 29, 1974

[54] MONITORING DEVICE FOR MONITORING THE SUPPLY OF FILAMENTS AND/OR TAPES TO ELECTRIC CABLE STRANDING MACHINES

[75] Inventor: Aldo Bellasio, Milan, Italy
[73] Assignee: Industrie Pirelli Societa per Azioni, Milan, Italy
[22] Filed: June 7, 1973
[21] Appl. No.: 367,868

[30] Foreign Application Priority Data
June 22, 1972 Italy .................................. 26025/72

[52] U.S. Cl. ............... 307/120, 200/61.18, 340/259
[51] Int. Cl. .......................................... H01h 35/06
[58] Field of Search ................................... 307/120; 200/61.13–61.19; 340/259, 260

[56] References Cited
UNITED STATES PATENTS
3,379,037   4/1968   Antonevich................ 200/61.18 X
3,488,017   1/1970   Schatteman ................. 200/61.17 X
3,551,691   12/1970  Nishimura........................... 307/120

*Primary Examiner*—Robert K. Schaefer
*Assistant Examiner*—M. Ginsburg
*Attorney, Agent, or Firm*—Brooks Haidt & Haffner

[57] ABSTRACT

A device for monitoring the supply of wire, thread, tape and the like to an electric cable manufacturing machine, e.g., a stranding machine. The device comprises a commutator driven by a part which is rotated by the material being fed, e.g., the supply drum or reel, a pair of brushes connected in a direct current circuit and connected and disconnected to and from each other by the commutator, a circuit for rectifying the alternating current component of the current in the direct current circuit and a relay controlled by the rectified component. The relay is used to control an alarm, and may also be used to control the stopping of the machine, when the commutator stops rotating by reason of interruption of the feed of the material.

11 Claims, 4 Drawing Figures

MONITORING DEVICE FOR MONITORING THE SUPPLY OF FILAMENTS AND/OR TAPES TO ELECTRIC CABLE STRANDING MACHINES

The present invention relates to an electrically operated monitoring device for monitoring the continuous unwinding of wires, threads, tapes and the like in the manufacture of electric cables, and in particular, it relates to a device able to provide a warning signal if the continuity of said unwinding is interrupted.

In the manufacture of electric cables, use is made of wires, threads, strands or tapes of different nature and size, hereinafter sometimes called filaments, which are collected on appropriate storing means, such as drums, reels and so on, from which they are payed out in the various processing steps.

For good results in the manufacturing process, it is important to check or monitor the continuity of the payingout operation, which could be interrupted for various reasons, e.g., because of the rupture of the thread or tape or the exhaustion of the amount stored in the supply source.

By way of example, to clarify the importance of checking the continuous unwinding of a thread, reference may be made to a reel placed into rotation by pulling therefrom a cotton thread which is wound thereon and progressively payed out by the pulling action exerted by a stranding machine used in the manufacture of telephone cables.

As is known, telephone cables are constituted by a large number of wires, to allow the connection with many circuits which can be joined to one another in various ways to form quads. When said connections are to be made and in view of the large number of quads present in a telephone cable, it is necessary to locate in a section of said cable the quad to whose ends certain apparatus is connected. In order to locate said quad, a cotton thread, or tracer threads, of a color different from the colors of other threads identifying other quads, is wound around the quad. The importance of indicating the rupture of said cotton thread and the stopping of the stranding machine when the thread ruptures is self-evident.

In most of the cases encountered in practice, said paying-out operation takes place, in a known manner, from a drum or a reel, which is caused to rotate with respect to its own axis, for example, by the thread which is stored onto it and which is payed-out therefrom.

In other cases, the paying-out operation is of the socalled "defilee" type, according to which the drum or reel is held stationary, and the thread is payed-out therefrom by drawing it from a point situated on the axis of said drum or reel.

The monitoring of the continuous unwinding of the thread can be carried out by watching the condition of rotatory motion of a pulley or wheel, situated along the travel of the thread being payed-out, which is caused to rotate by the thread itself.

This latter type of monitoring is necessarily the only possible one for threads payed-out according to the "defilee" unwinding system.

Besides visual checking system, which are of poor reliability in that constant watching is not possible, there are other systems for monitoring the regular unwinding of the thread.

Several devices comprising mechanical contact elements able to indicate the rupture of the threads have been devised. However, at the high rotation speed of the drum carrying the thread, said devices have sometimes given rise to disadvantages of mechanical nature.

The present invention aims at providing a device not having the above-mentioned disadvantages which is able to monitor the continuous unwinding of an element, such as a wire, thread, strand, tape and the like and to provide a signal if the continuity is interrupted.

Accordingly, one object of the present invention is to provide a device for monitoring the continuous unwinding of wires, threads, tapes and the like, especially in the manufacture of electric cables, responsive to the condition of rotatory motion, or interruption thereof, of an element or member involved in the paying-out of said wire, thread or tape, said device comprising means for generating a pulsating current in a circuit, means for transmitting the alternating component of said pulsating current, and means responsive to the presence of said alternating component and for actuating a warning signal when said alternating component is discontinued.

The objects of the invention will be apparent from the following detailed description of preferred embodiments thereof, which description should be considered in conjunction with the accompanying drawings, in which.

Figure 1:
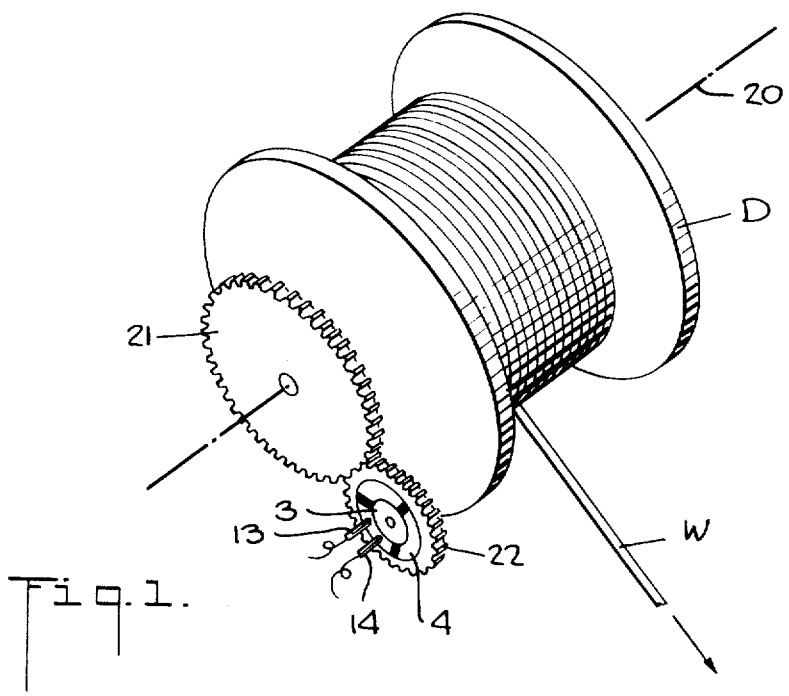
FIG. 1 is a diagrammatic, perspective view of a paying-off drum for a wire stranding machine and a portion of the device of the invention.
Figure 2:
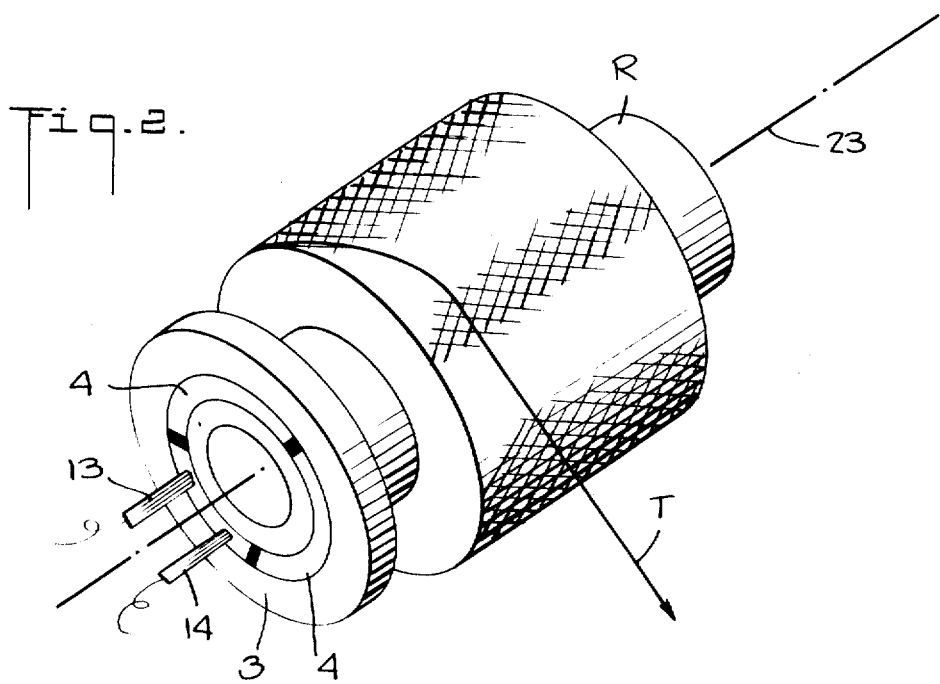
FIG. 2 is a diagrammatic, perspective view of a paying-off reel for cotton thread and a portion of the device of the invention.

The rotatable element involved in the paying-out of the wire, thread, etc., which operates the monitoring device of the invention can be any element which is rotated by the wire, thread, etc., as it is supplied to the standing machine and may, for example, be a drum or a reel on which the wire, thread, etc., is stored. FIGS. 1 and 2 illustrate by way of example two different forms of said rotatable element, FIG. 1 illustrating a drum D carrying wire W for a wire stranding machine and FIG. 2 illustrating a reel R carrying cotton thread T, as used in the manufacture of telecommunication cables. The device of the invention is able to monitor the continuous unwinding of the wire W from the drum D (FIG. 1) or the thread T from the reel R (FIG. 2).

In FIG. 1, the drum D is mounted for rotation about an axis 20 and is rotated by the force applied thereto when the wire W is pulled therefrom. If removal of the wire W is interrupted, the drum D stops rotating. A gear 21 is connected in any desired manner in driving relation with the drum D so that the gear 21 rotates with the drum D. The gear 21 drives a gear 22 which, in turn, rotates a commutator 3 having a plurality of segments in the form of conductive strips 4 mounted thereon and insulated from each other. The strips 4 are engaged by a pair of spaced brushes 13 and 14, and when the brushes 13 and 14 engage the same strip 4, they are conductively interconnected. When the brush 13 engages one strip 4 and the brush 14 engages a different strip 4, the brushes 13 and 14 are insulated from each other.

In FIG. 2, the reel R is mounted for rotation about an axis 23 and is rotated by the force applied thereto when the thread T is pulled therefrom. Thus, the reel R rotates while the thread T is moving and continuous but stops when the thread T stops or is broken. The commutator 3 is mounted so as to be driven by the reel R and has the construction and operation hereinbefore described.

Although it is preferred that the commutator 3 be driven by a reel or drum on which the material being monitored is stored, it may also be driven by another element which is rotated by the material being monitored, such as a pulley engaged and rotated by the material being monitored.

The circuit in which the hereinbefore-mentioned pulsating current is originated by the means associated with the drum or the reel, is a circuit fed with direct current. Direct voltage is always applied to the circuit and is supplied by any source of direct current which may be a source of alternating current which is rectified, e.g., by diodes connected in a bridge circuit.

When the drum D or reel R rotates in consequence of the action exerted by the wire W or thread T which is progressively payed-out, the commutator 3 associated with the rotating drum D or reel R opens and closes the direct current circuit, so that a pulsating current will circulate in the circuit.

When the drum D or reel R stops, in consequence of a rupture of the wire W or the thread T, the commutator 3 is in such a position as to maintain the circuit either closed or open. However, in whichever position it may be, the current no longer pulsates, i.e., it is steady at a maximum or is zero. The device of the invention preferably is constructed so as to allow the working of the machine to which the wire, thread, etc., is fed when a pulsating current is present and to provide a warning signal and stop the machine when the current has a steady value.

Figure 3:
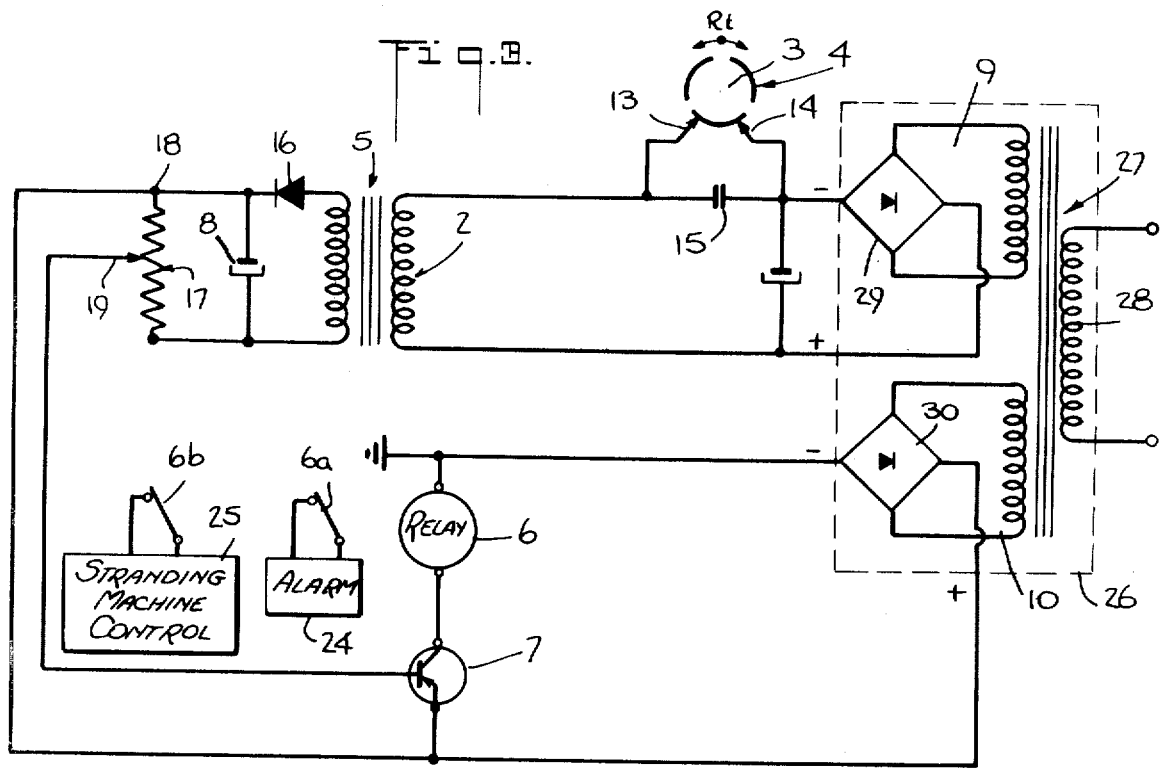
FIG. 3 is an electrical circuit diagram of oneembodiment of the invention.

One embodiment of the means for transmitting the alternating component of said pulsating current is the transform 5 illustrated in FIG. 3. The means for detecting said alternating component comprises a relay 6 preceded by an amplifier 7. The relay 6 is, moreover, able to actuate an alarm 24 when the alternating component is discontinued, since, as the physical state of the contacts 6a and 6b of the relay 6 varies when the thread T or wire W breaks, a change takes place in the electrical state of a signalling circuit of the alarm 24 which is controlled by the contact 6a of the relay 6. The contacts 6b of the relay 6 may be connected to the control circuit 25 for the machine being fed with the wire, thread etc., e.g., a wire stranding machine, so as to stop such machine when the wire or thread breaks.

Direct current for the commutator 3 and operation of the relay 6 is supplied by a conventional D.C. supply 26 comprising a transformer 27 having secondary windings 9 and 10, an alternating current input winding 28 and a pair of bridge rectifiers 29 and 30. When a strip 4 interconnects the brushes 13 and 14, as illustrated, the current flows through the primary, or input, winding 2 of the transformer 5, brush 13, strip 4 and brush 14 in series. When the brush 13 is on one strip 4 and the brush 14 is on a different strip 4, the current is interrrupted. A capacitor 15 is provided to reduce arcing when the circuit is opened and closed by the strips 4.

The secondary, or output, winding of the transformer 5 is connected to a smoothing capacitor 8 and a potentiometer 17 through a diode 16 which allows the passage of only the positive pulse at the output of the transformer 5. Thus, there is a uni-directional voltage between the terminals 18 and 19 which are connected to the base and emitter terminals of a transistor amplifier 7 connected in series with the coil of the relay 6.

When the drum D or reel R rotates, the commutator 3 opens the input circuit 2 of FIG. 3 every time a strip 4 is not in contact with one of the brushes 13 or 14, originating in this way a pulsating current in such circuit, and an output voltage due to the alternating component of the pulsating current is created at the terminals of the secondary winding of the transformer 5. The diode 16, connected to one terminal of the secondary winding of the transformer, allows only the passage of a part of the alternating component which provides a uni-directional voltage at the terminals of the smoothing capacitor 8 and the potentiometer 17.

When the capacitor 8 is not being charged during the time that the polarity is such that the diode 16 is nonconducting, its voltage is applied to the potentiometer 17 and the capacitor voltage decreases with time dependent upon the time constant determined by the product of the resistance of the potentiometer circuit and the capacitance of the capacitor 8.

This voltage between the points 18 and 19 is equal, as regards its instantaneous values, to the voltage supply of the alternating component at the terminals of the secondary winding of the transformer 5, after having been rectified by the diode 16 and smoothed by the capacitor 8. Under the conditions when the circuit 2 is being opened and closed, the emitter of the transistor 7, connected to the terminal 18 of the potentiometer 17, has a potential greater than that of the base of the transistor 7 connected to the arm of the potentiometer 17. Therefore, the transistor 7 is rightly polarized and conducts, thereby energizing the relay6 which is connected in series with the transistor 7 and the output of the supply 26. In this way, the relay 6 is supplied with the supply voltage minus the drop of voltage existing between the emitter and the collector of the transistor 7.

The relay 6 is so energized and remains in this condition, with its contacts 6a and 6b, for the signalling circuit and machine control circuit, open as long as the commutator 3 rotates. Therefore, the alarm is off and the working of the machine, e.g., the stranding machine, is permitted. When the wire W or thread T breaks, the drum D or reel R is no longer rotated, and the current circulating in circuit 2 is constant or zero depending on whether or not a strip 4 interconnects the brushes 13 and 14. Because of this, no voltage exists at the secondary winding of the transformer 5, so that the transistor 7, no longer polarized, is cut-off. The relay 6 is then de-energized, closing its contacts 6a for the signalling circuit and actuates the warning signal or alarm 24.

Moreover, the contacts 6b of the relay 6 are inserted in the braking circuit 25 of the machine (not shown) in such a way that, when the relay 6 is de-energized the contacts 6b cause the machine to stop.

Figure 4:
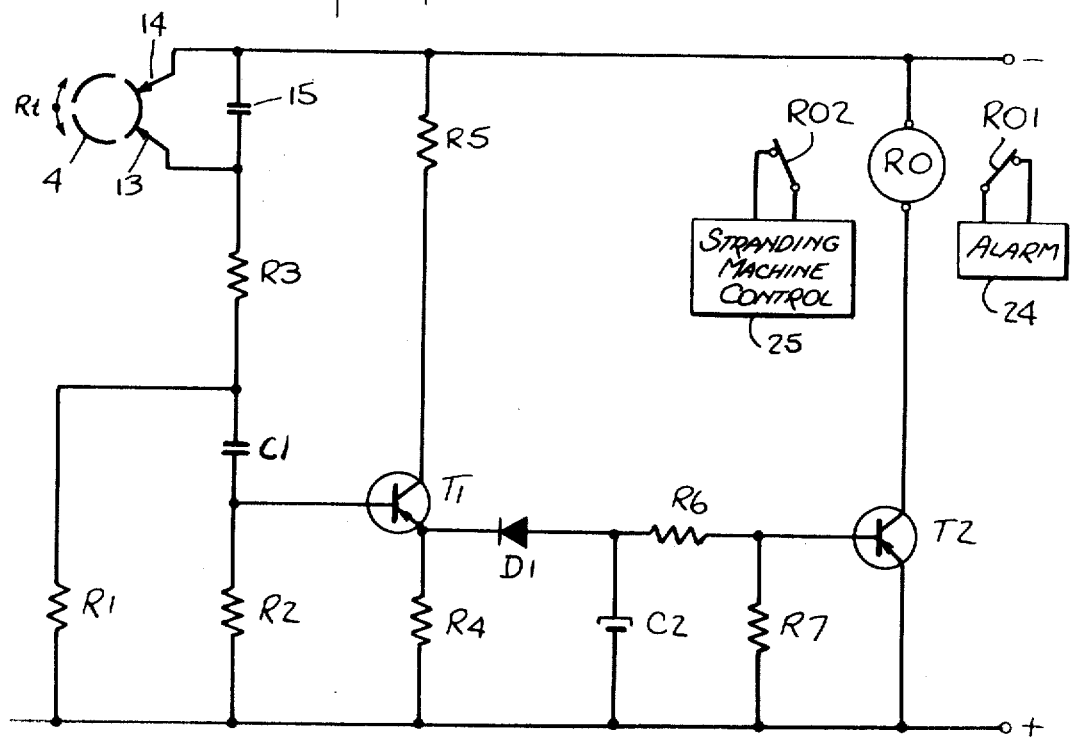
FIG. 4 is an electrical circuit diagram of an alternative embodiment of the invention.

In another embodiment of the device of the invention, the means for transmitting the alternating component of the pulsating current comprises a capacitor C1 (FIG. 4) connected to the direct current circuit. In the circuit of FIG. 4, like in that of FIG. 3, the means for detecting the presence of the alternating component comprises a relay RO, preceded by the amplification transistor T2, which is preceded in turn by a smoothing capacitor C2. The relay RO, has contacts RO1 and RO2 which, in the same way and through the same means described in connection with the circuit of FIG. 3, is able to actuate a warning signal or alarm 24 when the alternating component is discontinued, and to actuate the means for stopping the machine which is fed by the drum D or the reel R.

The operation of the device illustrated in FIG. 4 is analogous to the preceding one, except that the means for transmitting the alternating component produced by the pulsating current generated by the commutator 3, is constituted by a capacitor C1.

The brushes 13 and 14 and the strips 4 are connected in series between one terminal of the D.C. supply and the voltage divider R1 and R3 which is connected at one end of R1 to the other terminal of the supply. The junction point of the resistors R1 and R3 is coupled to one end of the resistor R2 and to the base of a transistor T1 by the capacitor C1 which transmits the alternating component of the current to the amplifier circuit including the transistor T1 and the resistors R4 and R5.

Every time the alternating component brings the base of the transistor T1 to a potential lower than that of the emitter, the transistor T1 becomes conductive and the alternating current, through the amplification constant of T1, is transmitted to the remaining part of the electrical circuit which commences with a diode D1. This part of the circuit is analogous to that of FIG. 3, namely, comprises a rectifier diode D1, a smoothing capacitor C2 and resistors R6 and R7 having the task of polarizing a transistor T2 which actuates a relay RO having the functions previously described.

The advantage of the present device resides in the fact that the machine to which the wire, thread, etc., is fed is always kept under control by means of simple electric elements, which can be easily replaced and applied, since the only element concerned with the material being payed-out is constituted by a commutator which, owing to its simple construction, ensures a reliable working in all uses.

A further advantage of the device resides in the fact that a possible lack of voltage to the electrical circuit of the device causes the immediate stopping of the machine, due to the de-energization of the relay 6 or RO.

Although preferred embodiments of the present invention have been described and illustrated, it will be understood by those skilled in the art that various modifications may be made without departing from the principles of the invention.

What is claimed is:

1. In electric cable manufacturing apparatus comprising a source of a filament for said cable and means for physically processing said filament in the manufacture of said cable and to which said filament is fed from said source, the combination therewith of a monitoring device for monitoring the feed of the filament from the source thereof to said means, said device comprising generating means controlled in accordance with the movement of said filament for generating a pulsating direct current dependent upon the movement of said filament and having a direct current component and an alternating current component, signal means responsive to said alternating current component and transfer means which transfers alternating current but blocks direct current connected to said generating means and said signal means for transmitting the alternating current component of said pulsating current from said generating means to said signal means without transmitting the direct current component of said current.

2. A monitoring device as set forth in claim 1, wherein said source is a rotatable member on which said filament is wound, said member being rotatable by said filament as it is fed, and wherein said generating means is driven by said rotatable member.

3. A monitoring device as set forth in claim 2, wherein said generating means comprises a commutator having a plurality of conductive segments and a pair of brushes connected by said segments as said commutator is rotated.

4. A monitoring device as set forth in claim 3, wherein said transfer means comprises a transformer having primary and secondary windings, said primary winding being connected to said generating means and said secondary winding being connected to said signal means.

5. A monitoring device as set forth in claim 3, wherein said transfer means comprises a capacitor connected in series between said generating means and said signal means.

6. A monitoring device as set forth in claim 1, wherein said signal means comprises an amplifier connected to said transfer means and a relay connected to and controlled by said amplifier.

7. A monitoring device as set forth in claim 6, wherein said signal means comprises an alarm connected to said relay and operable thereby in the absence of said alternating component.

8. A monitoring device as set forth in claim 6, further comprising a control circuit connected to said processing means for starting and stopping said processing means and wherein said control circuit is connected to and controlled by said relay for stopping said processing means in the absence of said alternating component.

9. A monitoring device as set forth in claim 1, wherein said filament engages a rotatable member which is rotatable by said filament as it is fed and wherein said generating means comprises a commutator having a plurality of conductive segments connected to and rotatable with said rotatable member, a pair of brushes connectible by said segments as said commutator is rotated and a source of direct current connected in series with said brushes, wherein said transfer means comprises an alternating current transfer circuit connected in series with said source of direct current and said brushes and wherein said signal means comprises rectifying means for rectifying said alternating current component and a relay connected to and responsive to the output of said rectifying means.

10. A monitoring device as set forth in claim 9, wherein said signal means further comprises an alarm connected to and operable by said relay in the absence of said alternating component.

11. A monitoring device as set forth in claim 9, further comprising a control circuit connected to said processing means for stopping said processing means and means interconnecting said control circuit and said relay for stopping said processing means in the absence of said alternating component.

* * * * *